E. H. BRISTOL.
GAGE.
APPLICATION FILED JAN. 13, 1913.
1,208,905.
Patented Dec. 19, 1916.
Fig. 1.
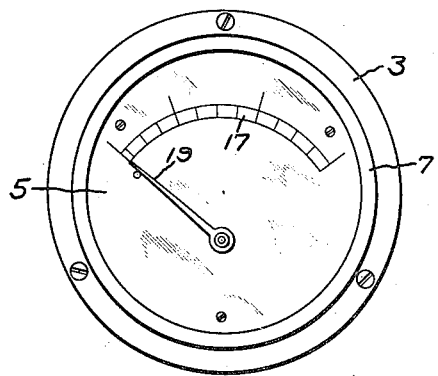
Fig. 2.
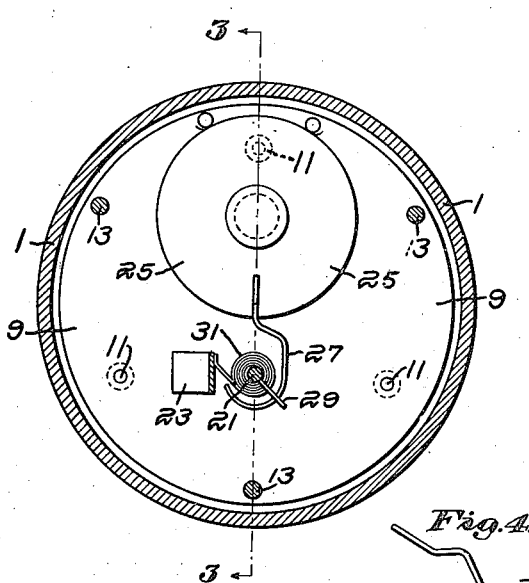
Fig. 3.
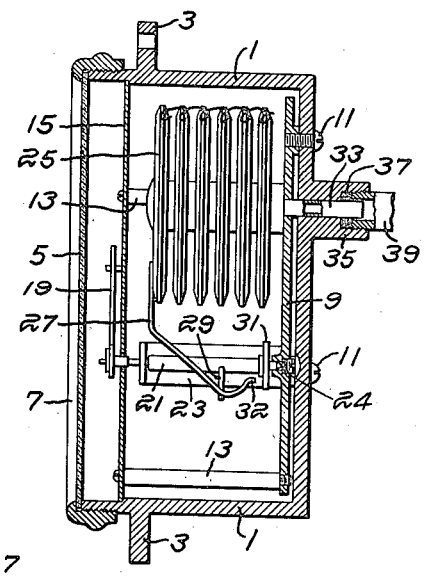
Fig. 4.
Witnesses:
Carl L. Choate.
Horace A. Crossman.
Inventor:
Edgar H. Bristol,
by Emery, Booth, Janney & Varney
Attys.

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

GAGE.

1,208,905.  Specification of Letters Patent.  Patented Dec. 19, 1916.

Application filed January 13, 1913. Serial No. 741,633.

*To all whom it may concern:*

Be it known that I, EDGAR H. BRISTOL, a citizen of the United States, and a resident of Foxboro, in the county of Norfolk and Commonwealth of Massachusetts, have invented an Improvement in Gages, of which the following description, in connection with the accompanying drawings, is a specification, like characters on the drawings representing like parts.

This invention relates to instruments responsive to changes in temperature, pressure or the like.

The character of the invention may be best understood by reference to the following description of an illustrative embodiment thereof shown in the accompanying drawing, wherein:

Figure 1 is a front elevation of an illustrative instrument embodying the invention; Fig. 2 on an enlarged scale is a vertical section through the instrument shown in Fig. 1; Fig. 3 is a vertical section taken on line 3—3 of Fig. 2; and Fig. 4 is a detail to be referred to.

Referring to the drawing, the illustrative instrument there shown as embodying the invention comprises a casing 1 of metal or other suitable material having a flange 3 provided with screw receiving eyes whereby the casing may be connected to any suitable support. The casing may be closed by a glass 5 held in place by a flanged ring 7 threaded to said casing.

Within the casing is a frame comprising a base plate 9 having feet resting against the bottom of the casing 1 and secured thereto by suitable screws 11. Supported from said base plate 9 by posts 13 is a dial plate 15 set in a counterbore in the casing and having a suitable scale 17 marked thereon. As shown herein, the scale is graduated on the arc of a circle to indicate a range of pressure from zero to twelve pounds. Coöperating with this scale is an index or pointer 19 movable over the scale and carried on one end of a shaft 21 journaled in apertures in a standard 23 projecting up from said plate. To resist axial thrust of the shaft a jewel bearing 24 may be provided set in a screw in said base plate. To govern the movement of said index suitable responsive means is provided, exemplified herein by a tube 25 composed of a series of expansible sections or diaphragms and adapted to be elongated or contracted by an increase or diminution of internal pressure. A tube of this general character is disclosed in United States Letters Patent No. 420,570 granted to W. H. Bristol, February 4, 1890. One end of this tube is fixedly secured to the base plate 9, while the other end is movable.

An important feature of the invention relates to means for transmitting movement of said expansion tube 25 to said index. To accomplish this there is provided cam means, exemplified herein as an arm 27 of steel wire or other suitable material. One end of said arm is secured to the movable end of the expansion tube 25 and the other projects beyond the edge of the expansion tube diagonally to and past the shaft 21 and coöperates with an arm or projection 29 on said shaft. Said cam and shaft arms are normally maintained in engagement by resilient means exemplified herein as a coil spring 31 having one end fast to said shaft and its opposite end fast to the standard 23, referred to. This spring preferably is very light and merely of sufficient strength to maintain the shaft arm 29 in engagement with the cam arm 27, and does not offer any substantial opposition to the movement of the index governing tube 25.

The expansion and contraction of the tube 25 will cause the cam arm to move or wipe past the shaft arm 29 and owing to the inclination of said cam arm the shaft arm is rocked and a movement of rotation is imparted to the index shaft from the expansion tube.

The expansion tube when moving in one direction, through the cam arm 27 will positively move the shaft arm and rotate the shaft and cause the index to swing over its dial more or less depending on the degree of movement of the expansion tube. When the tube moves in an opposite direction the cam arm will tend to move away from the shaft arm, but the latter will be held in engagement with said arm and will be caused to follow the same under the action of the coil spring 31. Thus the index shaft is turned in one direction by the movement of the expansion means and in the opposite direction by the spring, but the expansion tube is the controlling or governing means for the shaft when turning in both directions, the function of the spring being merely to maintain the shaft arm in engagement with the cam arm.

To prevent any possibility of the shaft arm escaping over the free end of the cam arm the end of the latter may be bent over and constitute a stop 32.

To admit fluid to the expansion tube 25 the latter may have a tube 33 projecting a substantial distance into a boss 35 at the rear of the casing. This boss has a bore larger than said tube and between them may be inserted packing 37. The boss is threaded to receive a pipe 39, the end of which may seat against said packing and thereby provide a tight joint.

It will be understood that the expansion tube is shown herein merely for illustrative purposes and that any other suitable responsive means may be employed if desired.

The cam arm is in a sense the thread of a screw and the shaft arm a follower which is controlled by the screw. Obviously the illustrative embodiment of the cam or screw arrangement is susceptible of various changes without departing from the spirit and scope of the invention.

The responsive tube and shaft members are always maintained in proper engagement by the spring. Hence there is no play or lost motion and the movement of the responsive member is always faithfully and accurately transmitted to the index.

The device is extremely simple in construction, cheap to manufacture and not liable to get out of order.

Having described one embodiment of the invention, without limiting the same thereto, what I claim as new and desire to secure by Letters Patent is:

1. A gage comprising, in combination, a pressure responsive member, a shaft journaled laterally of said member and extending substantially parallel to the direction of movement of the same, a pin extending outwardly from said shaft, an arm carried by said pressure responsive member for movement therewith and extending obliquely adjacent said pin and means tending to rotate said shaft to bring said pin in contact with said arm.

2. A gage comprising, in combination, a pressure responsive member, a journaled, index-carrying shaft, a pin extending outwardly from said shaft, an arm carried by said pressure responsive member for movement therewith and extending obliquely adjacent one side of said pin and a spring connected with said shaft and tending to rotate said pin into contact with said arm.

In testimony whereof, I have signed my name to this specification, in the presence of two subscribing witnesses.

EDGAR H. BRISTOL.

Witnesses:
HENRY T. WILLIAMS,
JOHN R. MOULTON.